(12) United States Patent
Shibutani (10) Patent No.: US 7,436,446 B2
(45) Date of Patent: Oct. 14, 2008

(54) IMAGING DEVICE EQUIPPED WITH AUTOMATIC EXPOSURE CONTROL FUNCTION

(75) Inventor: Atsushi Shibutani, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 784 days.

(21) Appl. No.: 10/924,601

(22) Filed: Aug. 23, 2004

(65) Prior Publication Data

US 2005/0057546 A1    Mar. 17, 2005

(30) Foreign Application Priority Data

Aug. 29, 2003   (JP)   ............... 2003-305940

(51) Int. Cl.
  H04N 5/222   (2006.01)
  H04N 5/225   (2006.01)
  H04N 5/235   (2006.01)
  G09G 3/30   (2006.01)

(52) U.S. Cl. .................. 348/333.13; 348/372; 348/362; 348/229.1; 345/77

(58) Field of Classification Search ............ 348/333.13, 348/363, 364, 372, 229.1, 221.1; 345/77; 313/310
  See application file for complete search history.

(56) References Cited

U.S. PATENT DOCUMENTS 5,825,417 A * 10/1998 Yoshida ...................... 348/364

6,593,691 B2 * 7/2003 Nishi et al. .................. 313/310
6,822,689 B1 * 11/2004 Nakakuki et al. ........... 348/364
6,864,665 B2 * 3/2005 Yoshida ....................... 345/102
7,304,654 B2 * 12/2007 Mori et al. ..................... 345/77
2004/0119877 A1 * 6/2004 Shinozaki .................... 348/362
2004/0222951 A1 * 11/2004 Lee et al. ....................... 345/77

FOREIGN PATENT DOCUMENTS

| EP | 1 107 583 A2 | 6/2001 |
| EP | 1 107 583 A3 | 8/2001 |
| EP | 1 469 448 A1 | 10/2004 |
| JP | 5-216435 A | 8/1993 |
| JP | 2000-253321 A | 9/2000 |
| JP | 2001-275027 A | 10/2001 |
| JP | 2001-298639 A | 10/2001 |
| WO | WO 03/058593 A1 | 7/2003 |

* cited by examiner

Primary Examiner—Nhan T Tran
(74) Attorney, Agent, or Firm—Frishauf, Holtz, Goodman & Chick, P.C.

(57) ABSTRACT

An imaging device comprises an organic EL monitor for displaying an image from an image pick-up device. A controller sets such initial values of at least one of a diaphragm amount, an exposure time, and a gain to values for causing control that the luminance level is increased toward a proper level when a power is turned on. Displaying of a through-image of only white is prevented.

11 Claims, 7 Drawing Sheets

IMAGING DEVICE EQUIPPED WITH AUTOMATIC EXPOSURE CONTROL FUNCTION

CROSS-REFERENCE TO RELATED APPLICATIONS

This application is based upon and claims the benefit of priority from prior Japanese Patent Application No. 2003-305940, filed Aug. 29, 2003, the entire contents of which are incorporated herein by reference.

BACKGROUND OF THE INVENTION

1. Field of the Invention

The present invention relates to an imaging device and an imaging method usable for a camera device such as a digital camera equipped with an automatic exposure control function.

2. Description of the Related Art

A conventional digital camera for recording an image picked-up by using an imaging element such as a CCD as digital data generally comprises a display unit which functions as an electronic view finder for displaying a through-image at standby time for photographing, and as an image display monitor during reproduction of a recorded image. For the display unit, a liquid crystal monitor or the like that uses a liquid crystal panel such as a low-temperature polysilicon TFT as a display element is utilized. Recently, a display unit that uses an organic electroluminescence (EL) element to enable full-color displaying has reached a level of practical application (referred to as an organic EL monitor, hereinafter). There is now a digital camera or the like on which such an organic EL monitor is mounted.

The organic EL monitor is constituted in such a manner that self-luminous emission layers of, e.g., RGB, and a transparent electrode layer are stacked, three sub pixels are arranged in the same position to constitute one pixel (picture element), and the emission layers are individually controlled for luminance by a transparent electrode to enable full-color displaying. Driving for each pixel is carried out by a passive matrix system or an active matrix system as in the case of a liquid crystal monitor. Incidentally, it is expected that use of the organic EL monitor in the digital camera will expand because of small power consumption, possibility of thinning, no problem of an angle of a visual field which occurs in the liquid crystal monitor, and the like.

On the other hand, the digital camera or the like usually comprises an automatic exposure (AE) control function, i.e., a function of controlling a luminance level of an image signal output from an imaging element such as a CCD so that the luminance level may be a proper value. The AE control is a feedback control which calculates a control value of a diaphragm amount, an exposure time, a gain or the like based on, e.g., a luminance component contained in the image signal output from the imaging element at a predetermined exposure cycle, more specifically a luminance average of all pixels in image data generated from the image signal, and adjusts the diaphragm amount, the exposure time, the gain or the like at next exposure timing based on a result of the calculation. The control value varies from one imaging device to another. For example, in a camera of no diaphragm Ming (diaphragm amount is fixed), a control value excluding a diaphragm amount is calculated by AE control.

In the case of executing the AE control, it is uncertain whether the surroundings are bright or dark immediately after power is turned on. Thus, at the time of starting control, a medium value in a controllable range is set as the aforementioned control value. Thereafter, control is executed based on an image signal of actual imaging.

BRIEF SUMMARY OF THE INVENTION

An object of the invention is to prolong a battery life of an imaging device which comprises a self-luminous element such as an organic EL monitor and an imaging method capable of prolonging a battery life.

According to an embodiment of the present invention, an imaging device comprises an imaging element which outputs an image signal obtained by an imaging operation, a self-luminous element which displays an image based on the image signal output from the imaging element, and a limiting unit which limits brightness of the image displayed by the self-luminous element.

According to another embodiment of the present invention, an imaging device comprises means for outputting an image signal obtained by an imaging operation, a self-luminous element which displays an image based on the image signal, and means for limiting brightness of the image displayed by the self-luminous element.

According to still another embodiment of the present invention, an imaging method comprises outputting an image signal obtained by an imaging operation, causing a self-luminous element to display an image based on the image signal, and limiting brightness of the image displayed by the self-luminous element.

According to another embodiment of the present invention, an imaging control program causes a computer of an imaging device to execute processing of outputting an image signal obtained by an imaging operation, processing of causing a self-luminous element to display an image based on the image signal, and processing of limiting brightness of the image displayed by the self-luminous element.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

First Embodiment

Figure 1:
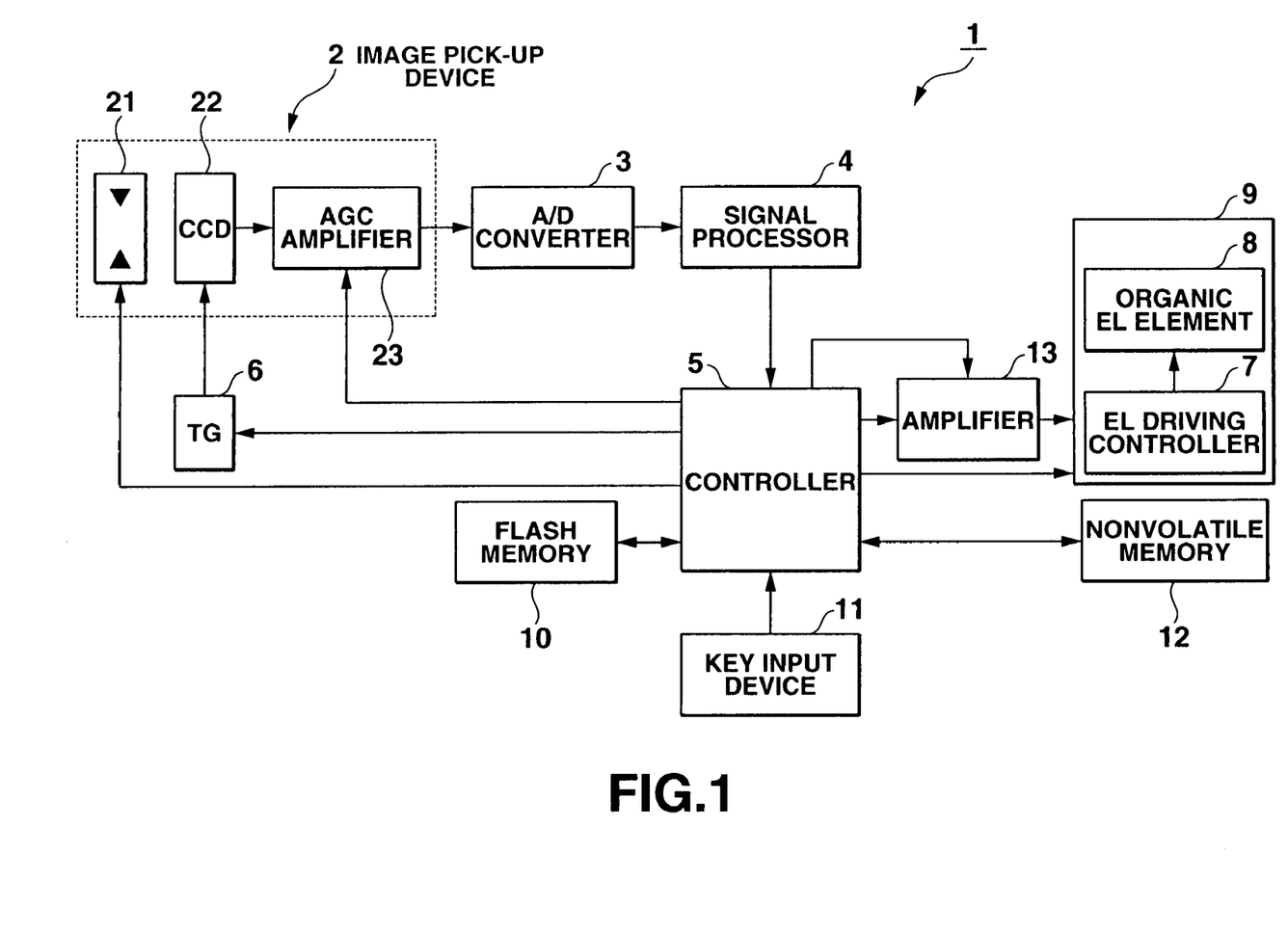
FIG. 1 is a schematic block diagram of a digital camera according to embodiments of the present invention.

A first embodiment of the present invention will be described with reference to the accompanying drawings. FIG. 1 is a block diagram showing a schematic constitution of a digital camera 1 according to the first embodiment.

The digital camera 1 has an AE function and comprises an image pick-up device 2, an A/D converter 3, a signal processor 4, a controller 5, and a timing generator (TG) 6. The image pick-up device 2 comprises a diaphragm device 21, a CCD 22, and an AGC amplifier 23, and subjects an optical image of an object entered through the diaphragm device 21 to photoelectric conversion by the CCD 22. The CCD 22 is driven by a timing signal sent from the timing generator 6 to output an image signal of one screen at a fixed cycle. The AGC amplifier 23 amplifies an analog signal output from the CCD 22, and outputs the amplified signal to the A/D converter 3.

The A/D converter 3 converts the image signal output from the AGC amplifier 23 into a digital signal, and outputs the digital signal to the signal processor 4. The signal processor 4 generates digital image signals of R, G, and B from the image signal converted into the digital signal, executes image processing such as pixel interpolation processing, white balance processing, or luminance/color-difference signal conversion processing, and lastly outputs the image signals as YUV data containing a luminance signal (Y signal) and color-difference signals (Cb signal, Cr signal), i.e., digital image signals, to the controller 5.

The controller 5 comprises peripheral circuits such as a CPU, a program ROM, and a RAM (not shown). An organic EL monitor 9 that comprises an EL driving controller 7 and an organic EL (electroluminescence) element 8 is connected through an amplifier 13 to the controller 5, and a flash memory 10, a key input device 11, and a nonvolatile memory 12 are also connected to the same. In the controller 5, the CPU controls each section of the digital camera 1 based on various programs stored in the program ROM, and a key operation signal sent from the key input device 11. The program ROM stores programs which cause the CPU to function as exposure controller, and to execute automatic exposure (AE) control for adjusting a diaphragm amount of the diaphragm device 21, an exposure time of the CCD 22, and a gain of the AGC amplifier 23.

The organic EL monitor 9 displays a cyclically imaged through-image at standby time for photographing, and a reproduced image during image reproduction based on the image signal sent from the controller 5, and further displays various menu screens or setting screens for operation assistance as occasion demands. The organic EL element 8 is capable of full-color displaying, and driven by, e.g., a passive matrix system or an active matrix system, based on a driving signal sent from the EL driving controller 7 to emit a light itself. An emission color and emission luminance are controlled for each pixel, and the control of the emission luminance is carried out by an increase/decrease of an applied voltage.

The flash memory 10 stores image data picked-up by the image pick-up device 2 in response to user's shutter key operation, e.g., image data compressed by the controller 5. Incidentally, the flash memory 10 may be incorporated in the digital camera 1, or detachably attached to the digital camera.

The nonvolatile memory 12 stores data needed to be held even when the power is turned off, e.g., various setting data set by the user. For example, the setting data includes the following. Two kinds of recording modes for photographing, i.e., a normal mode and a power saving mode, are settable. The normal mode corresponds to a second operation mode of the invention, and the power saving mode corresponds to a first operation mode. These modes can be set in a switching manner by the user, and information of the setting is stored as setting data. Various programs stored in the program ROM of the controller 5 can be stored in the nonvolatile memory 12.

The key input device 11 comprises a shutter key, a power on/off key (main power source key), a mode switching key used for operation mode switching, and a cursor key, a set key, and the like used for function selection or screen selection, and outputs an operation signal to the CPU of the controller 5 in accordance with a key operation. The mode switching key is used for switching between a recording mode for photographing which is a main operation mode of the digital camera 1 and a reproducing mode for recorded image reproduction.

Figure 2:
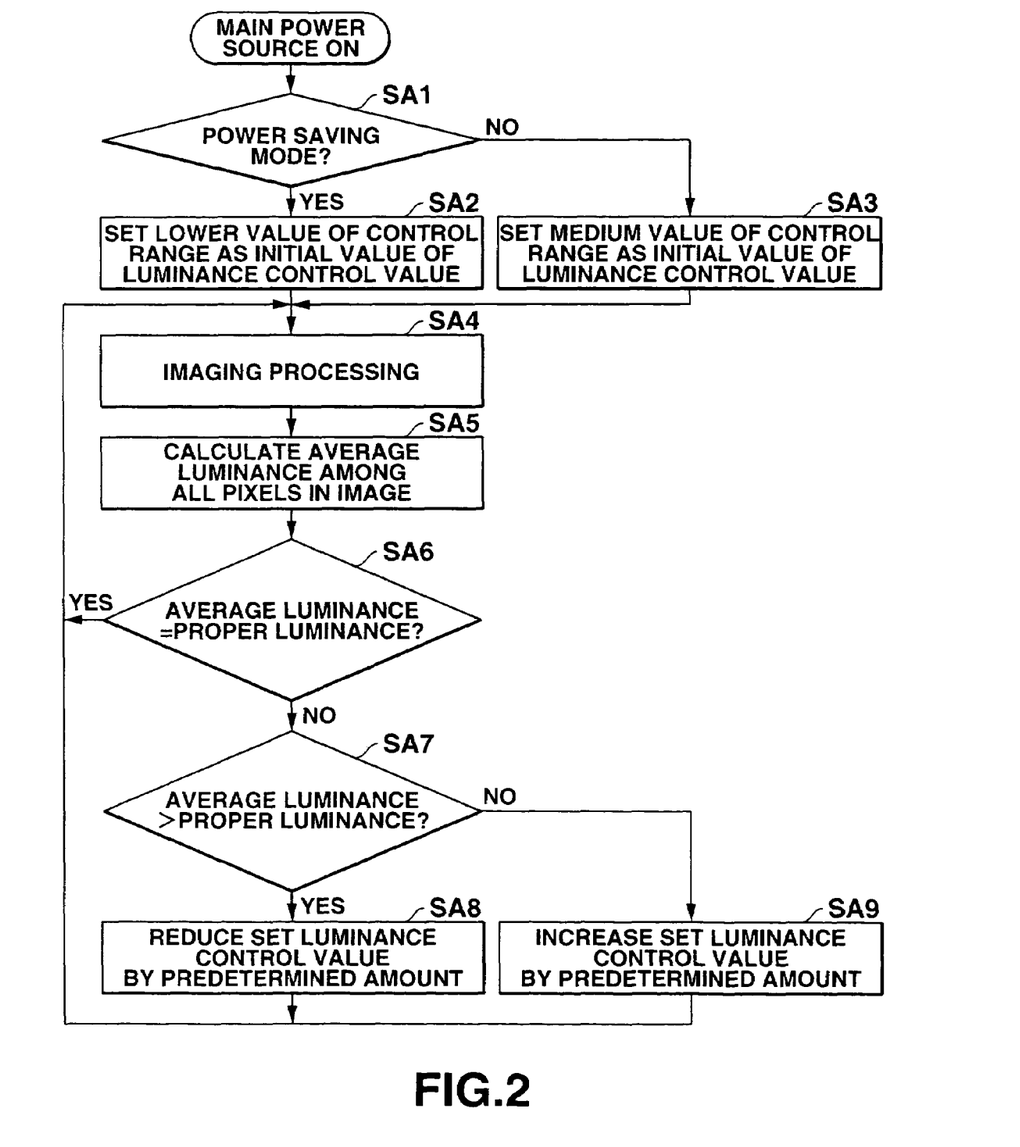
FIG. 2 is a flowchart showing an exposure control operation in the digital camera according to a first embodiment.

Next, description will be made of contents of the automatic exposure control executed by the CPU of the digital camera 1. FIG. 2 is a flowchart showing an exposure control process executed by the CPU when the user turns the main power source on by operating the power source on/off key in a state in which the recording mode has been set.

When the main power source is turned on, it is determined in step SA1 whether or not a power saving mode is set. If not the power saving mode but the normal mode is selected (NO in step SA1), the following general exposure control is executed. First, as initial values of a plurality of luminance control values for adjusting a luminance level of an image signal to be an optimal value, i.e., the diaphragm amount, the exposure time, and the gain, a medium value in a control range thereof (adjustment range) is set in the diaphragm device 21, the CCD 22, and the AGC amplifier 23 (step SA3). The first imaging processing is carried out based on the initial diaphragm amount, the initial exposure time, and the initial gain which have been set (step SA4). Next, luminance of all the pixels for an image obtained by the imaging processing is detected, and average luminance thereof is calculated (step SA5). The calculation of average luminance may be executed by separately disposing an integrator, and a hardware system of the integrator.

Then, if the average luminance calculated in step SA5 is not equal to predetermined proper luminance (NO in step SA6), and brighter than the proper luminance (YES in step SA7), the luminance control value is reduced by a predetermined amount to lower the luminance level of the image signal. That is, a diaphragm amount is reduced by a predetermined amount (aperture area of the diaphragm is reduced), an exposure time is shortened by predetermined time, and/or a gain of the AGC amplifier 23 is reduced by a predetermined amount (step SA8).

If the average luminance calculated in step SA5 is not equal to the predetermined proper luminance (NO in step SA6), and darker than the proper luminance (NO in step SA7), the luminance control value is increased by a predetermined amount to increased the luminance level of the image signal. That is, a diaphragm amount is increased by a predetermined amount (aperture area of the diaphragm is enlarged), an exposure time is extended by predetermined time, and/or a gain of the AGC amplifier 23 is increased by a predetermined amount (step SA9).

Subsequently, the process returns to step SA4 to execute second imaging processing, and then the processing of step SA5 and after are repeated. When the average luminance calculated in step SA5 is equal to the predetermined proper luminance, i.e., it is converged to the proper luminance (YES in step SA6), the process returns to step SA4 while the luminance control value of this time is maintained. Thereafter, the luminance level of the image signal is controlled by repeating similar processing so that it may be a proper value.

Figure 3A:
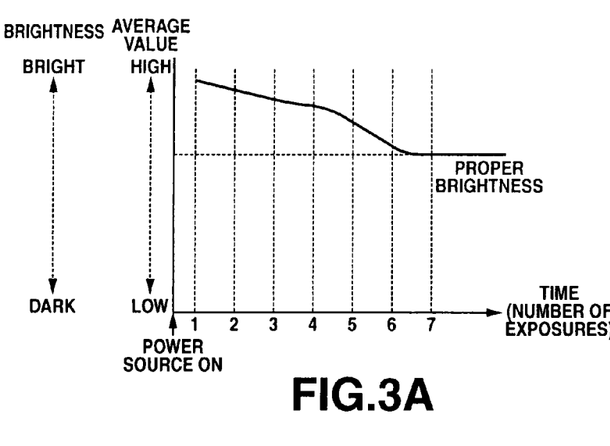
FIGS. 3A, 3B, 3C, and 3D are views showing changes in an average luminance, an exposure time, a gain, and a diaphragm amount immediately after an on operation of a main power source which accompanies an exposure control process on a normal mode.
Figure 3B:
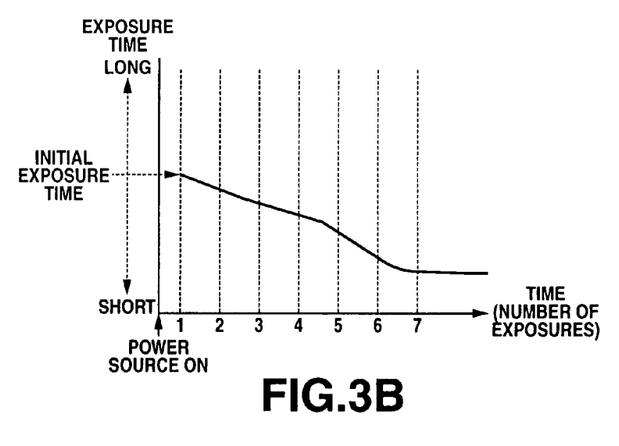
Figure 3C:
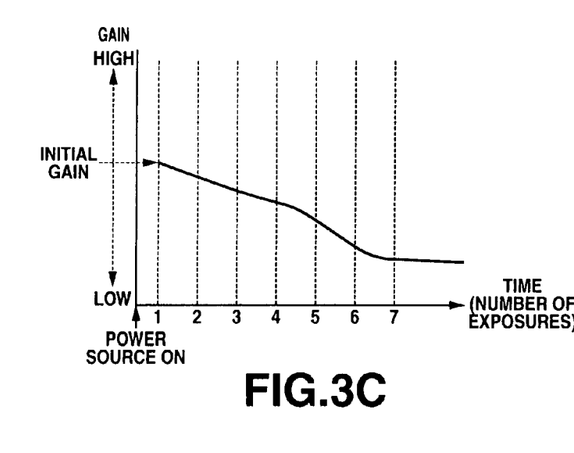
Figure 3D:
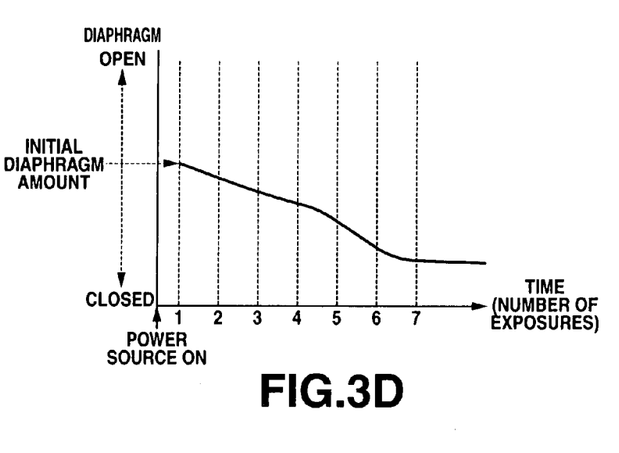

FIGS. 3A to 3D show changes (indicated by solid lines in the drawings) in an average luminance of an image and luminance control values of an exposure time, a gain, and a diaphragm amount at the time immediately after the main power source is turned on under the circumstances of relatively bright surroundings of the digital camera 1. The change of an average luminance shown in FIG. 3A is directly reflected on brightness of a through-image displayed on the organic EL monitor 9. Accordingly, under the relatively bright circumstances, the brightness of the through-image displayed on the monitor is changed to be darker toward proper brightness.

On the other hand, if the determination result of step SA1 is YES, and the power saving mode has been set when the main power source is turned on, as initial values of the plurality of luminance control values (diaphragm amount, exposure time and gain), predetermined values smaller than a medium value of a control range (adjustment range) thereof are set (step SA2).

The predetermined values are determined such that a processing operation which causes the determination result of step SA7 to be always NO and which increases the luminance control value by a predetermined amount to increase the luminance level of the image signal at step SA8 is repeated at least until the average luminance first becomes equal to the proper value while steps SA4 to SA9 are repeated. The predetermined value is smaller than the medium value of the control range and may be minimum value of the control range. However, the predetermined values are not limited to the above values. It is not necessary to repeat the processing operation which causes the determination result of step SA7 to be always NO and which increases the luminance control value by a predetermined amount to increase the luminance level of the image signal at step SA8. It is sufficient for the predetermined value to decrease the average luminance of the image. Therefore, the predetermined value may be a value which is merely smaller than the medium value of the control range.

Then, the luminance level of the image signal is controlled to be a proper level by repeating the process of steps SA4 to SA9.

Figure 4A:
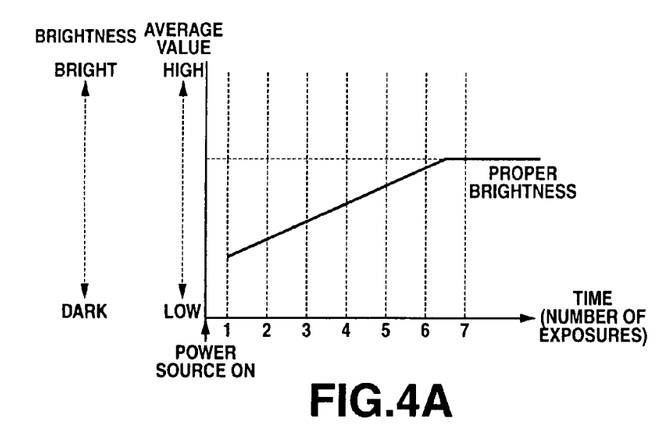
FIGS. 4A, 4B, 4C, and 4D are views showing changes in an average luminance, an exposure time, a gain, and a diaphragm amount immediately after the main power source is turned on which accompanies an exposure control process on a power saving mode.
Figure 4B:
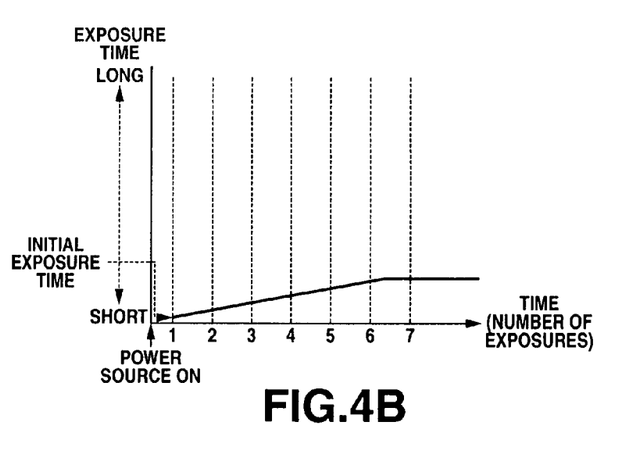
Figure 4C:
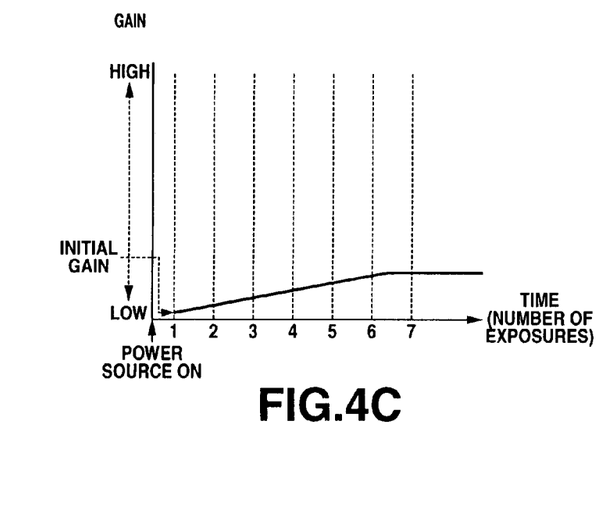
Figure 4D:
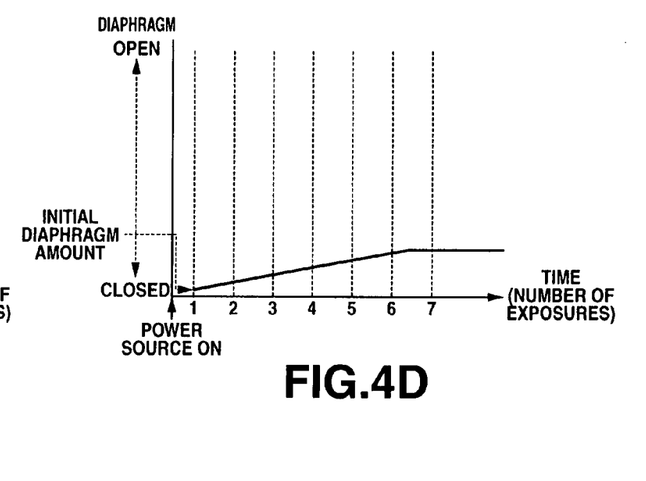

FIGS. 4A to 4D show changes in an average luminance of an image, luminance control values of an exposure time, a gain, and a diaphragm amount in the described case corresponding to FIGS. 3A to 3D. The change of the average luminance shown in FIG. 4A is directly reflected on brightness of a through-image displayed on the organic EL monitor 9. Accordingly, under the relatively bright circumstances, brightness of the through-image displayed on the organic EL monitor 9 is changed to be brighter toward proper brightness. Besides, in exposure control on the power saving mode, since the initial values of the diaphragm amount, the exposure time, and the gain set at the time of starting the control are small values as described above, the brightness of the through-image immediately after the on operation of the main power source is changed to be always brighter toward the proper brightness irrespective of brightness of the surroundings at this time.

According to the first embodiment, when the exposure control is executed on the normal mode or the power saving mode, the diaphragm amount of the diagram device 21, the exposure time of the CCD 22, and the gain of the AGC amplifier 23 are adjusted. However, for example, if the camera 1 does not comprise the diaphragm device 21 and a diaphragm amount is fixed, exposure control may be executed based on an exposure time and a gain only. If the camera comprises the diaphragm device 21 as in the case of the embodiment, control in which a diaphragm amount is fixed or an exposure time is fixed may be executed. Additionally, control may be executed by setting priority among a diaphragm amount, an exposure time, and a gain. For example, the luminance level of the image signal may first be controlled by only adjusting the diaphragm amount. When an adjustment limit thereof is exceeded, control based on adjustment of the exposure time may be started. When an adjustment limit thereof is exceeded, control based on adjustment of the gain may be started.

According to the first embodiment, the currently set luminance control value is increased/decreased by a predetermined amount when the average luminance of the image is determined not to be proper luminance. However, the present invention can be applied to an exposure control method which changes the luminance control value currently set based on the average value to a luminance control value so that average luminance of an image obtained by next imaging processing can become proper luminance if the average luminance of the image is determined not to be proper luminance.

Furthermore, according to the first embodiment, the normal mode and the power saving mode are selectable, and the brightness of the image displayed on the organic EL monitor 9 is limited only when the power saving mode is set. However, the power saving mode only may be provided without providing a normal mode.

Other embodiments of the imaging device according to the present invention will be described. The same portions as those of the first embodiment will be indicated in the same reference numerals and their detailed description will be omitted.

Second Embodiment

Next, a second embodiment of the present invention will be described. The block diagram of the second embodiment is the same shown in FIG. 1. According to the second embodiment, the program ROM stores a program for causing the CPU of the controller 5 to execute exposure control (exposure control for setting a medium value of a control range as an initial value of a luminance control value) similar to that of the normal mode even on the power saving mode, and the following display luminance control.

Figure 5:
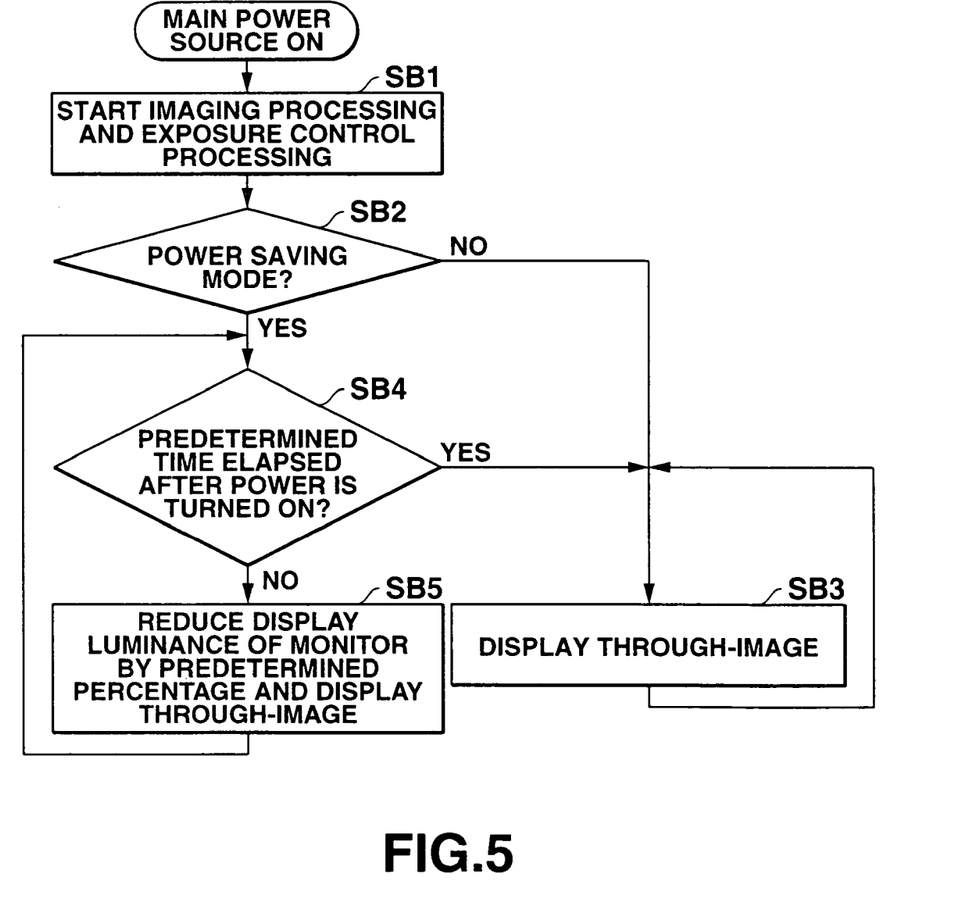
FIG. 5 is a flowchart showing a display luminance control operation of an organic EL monitor in the digital camera according to a second embodiment.

FIG. 5 is a flowchart showing a process of display luminance control executed by the CPU when a user turns on a main power source in a state in which a recording mode has been set according to the second embodiment.

According to the second embodiment, after the main power source is turned on, the CPU starts cyclical imaging processing and exposure control processing (step SB1). If not the power saving mode but the normal mode is set (NO in step SB2), an image obtained by the imaging processing is displayed as a through-image on an organic EL monitor 9 (step SB3). Thereafter, the through-image is cyclically updated by repeating the process.

On the other hand, if the power saving mode is set when the main power source is turned on (YES in step SB2), until a predetermined time elapses after the on operation of the main power source (NO in step SB4), the CPU controls an EL driving controller 7 to reduce display luminance of the organic EL monitor 9 compared to the normal state, i.e., emission luminance of an organic EL element 8 is reduced by a predetermined percentage, and to display the image obtained by the imaging processing as a through-image in this state (e.g., a state of a reduction to about 70% of a normal level) (step SB5). Incidentally, the predetermined time is preferably time necessary for lowering a luminance level of an image signal to a certain luminance level which does not reach a proper value when the luminance level is a normally expected maximum level immediately after the start of the exposure control.

As described above, the processing of step SB5 is repeated until the predetermined time elapses to cyclically update the through-image. After the passage of predetermined time (YES in step SB4), the process moves to normal through-image displaying of step SB3 similar to that when the normal mode is set.

Thus, according to the second embodiment, if the power saving mode has been set when the main power source is turned on, the emission luminance of the organic EL element 8 is controlled to be lower than normal luminance within predetermined time, and brightness of the through-image displayed on the organic EL monitor 9 is reduced by a predetermined percentage from a normal level.

Incidentally, according to the second embodiment, if the power saving mode is, within the predetermined time after the on operation of the main power source, the display luminance of the organic EL monitor 9 is reduced by the predetermined percentage to display the through-image. However, because the predetermined time is very short, within the predetermined time after the on operation of the main power source, the display luminance of the organic EL monitor 9 may be set to zero to stop the displaying of the through-image. Alternatively, within the predetermined time after the on operation of the main power source, a maximum value of the display luminance of the organic EL monitor 9 may be limited to predetermined luminance. In other words, a limiter of predetermined luminance may be applied.

Additionally, according to the second embodiment, the display luminance (emission luminance) of the organic EL monitor 9 is reduced by directly controlling the same. However, the controller 5 may reduce luminance of an image at a point of its generation based on an image signal beforehand, or control an amplification factor of the amplifier 13 when the generated image is output to the organic EL monitor 9, whereby the luminance of the image input to the organic EL monitor 9 may be lowered to reduce the display luminance thereof.

If the power saving mode has been set, within the predetermined time after the on operation of the main power source, the display luminance of the organic EL monitor 9 is reduced by a predetermined percentage to display the through-image. However, the following may be employed. For example, display luminance of the organic EL monitor 9 corresponding to luminance of an image displayed thereon is decided beforehand, and its setting data is stored in the program ROM or the like. Then, the display luminance of the organic EL monitor 9 is set to luminance corresponding to the average luminance calculated each time when the exposure control processing is executed within the predetermined time, whereby brightness of the displayed through-image is reduced.

Furthermore, according to the second embodiment, the normal mode and the power saving mode are selectable, and the brightness of the image displayed on the organic EL monitor 9 is limited only when the power saving mode is set. However, the power saving mode only may be provided without providing a normal mode.

Third Embodiment

Next, a third embodiment of the present invention will be described. The block diagram of the third embodiment is the same shown in FIG. 1. According to the third embodiment, the program ROM stores a program for causing the CPU of the controller 5 to execute the following display luminance control different from that of the second embodiment.

Figure 6:
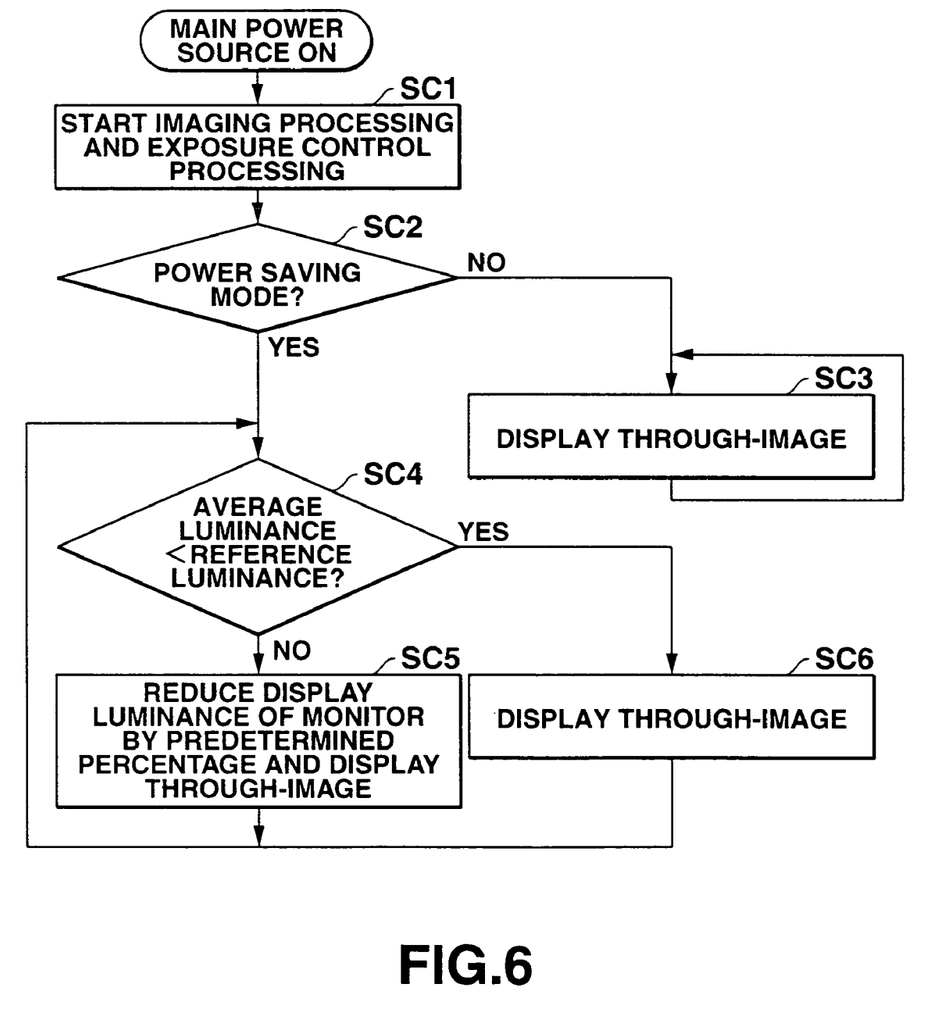
FIG. 6 is a flowchart showing a display luminance control operation of an organic EL monitor in the digital camera according to a third embodiment.

FIG. 6 is a flowchart showing a process of display luminance control executed by the CPU when a user turns on a main power source in a state in which a recording mode has been set according to the third embodiment.

According to the third embodiment, after the main power source is turned on, the CPU starts cyclical imaging processing and exposure control processing (step SC1). Subsequently, if not a power saving mode but a normal mode is set (NO in step SC2), an image obtained by the imaging processing is displayed as a through-image on an organic EL monitor 9 (step SC3). Thereafter, the through-image displayed on the organic EL monitor 9 is updated for each imaging processing while the recording mode is set.

On the other hand, if the power saving mode has been set when the main power source is turned on (YES in step SC2), and the average luminance calculated in exposure control processing (average luminance of all pixels in an image obtained by the imaging processing) is higher than a predetermined reference value (NO in step SC4), the image obtained by the imaging processing is displayed as a through-image in a state in which display luminance of the organic EL monitor 9 is reduced by a predetermined percentage (step SC5). That is, the through-image whose brightness is lower than that of a normal case is displayed. Incidentally, details of the process are similar to those of step SB5 of the second embodiment.

When the average luminance is not higher than the predetermined reference value while the aforementioned processing is repeated (YES in step SC4), the process moves to through-image displaying which causes no reduction in the display luminance of the organic EL monitor 9, i.e., normal through-image displaying similar to that of step SC3 (step SC6) set. Thereafter, while the recording mode is set, the through-image displayed on the organic EL monitor 9 is updated for each imaging processing. Additionally, if brightness of an object is suddenly changed, and the average luminance calculated in the exposure control processing exceeds the predetermined reference value while the through-image is updated by the processing of step SC6 (No in step SC4), the process moves again to the through-image displaying with reduction of luminance of step SC5.

As described above, according to the third embodiment, if the power saving mode has been set when the main power source is turned on, emission luminance of an organic EL element 8 is controlled to be lower than normal luminance until the average luminance of the image becomes equal to/lower than the reference value, and the through-image displayed on the organic EL monitor 9 is darker by a predetermined percentage than a normal level.

Incidentally, according to the third embodiment, the display luminance of the organic EL monitor 9 is reduced by the predetermined percentage when the average luminance of the image is equal to/higher than the reference value. However, the display luminance of the organic EL monitor 9 may be reduced by a predetermined percentage only in a period from the on operation of the main power source to the time when the average luminance of the image becomes equal to/lower than the reference value.

According to the embodiment, the display luminance of the organic EL monitor 9 is reduced by the predetermined percentage to display the through-image in the period from the on operation of the main power source to the time when the average luminance of the image becomes equal to/lower than the reference value. However, because the time is very short, in the period until the average luminance becomes equal to/lower than the reference value, the display luminance of the organic EL monitor 9 may be set to zero to stop the displaying of the through-image.

According to the third embodiment, the display luminance of the organic EL monitor 9 is reduced as much as the predetermined percentage when the average luminance of the image is equal to/higher than the reference value. However, a maximum value of the display luminance of the organic EL monitor 9 may be limited to predetermined luminance or lower. In other words, a limiter of predetermined luminance may be applied.

Additionally, according to the third embodiment, as in the case of the second embodiment, the display luminance (emission luminance) of the organic EL monitor 9 is reduced by directly controlling the same. However, the controller 5 may reduce luminance of an image at a point of its generation based on an image signal beforehand, or control an amplification factor of the amplifier 13 when the generated image is output to the organic EL monitor 9, whereby the luminance of the image input to the organic EL monitor 9 may be lowered to reduce the display luminance thereof.

According to the third embodiment, the display luminance of the organic EL monitor 9 is reduced by the predetermined percentage when the average luminance of the image is equal to/higher than the reference value. However, the following may be employed. For example, display luminance of the organic EL monitor 9 corresponding to luminance of an image displayed thereon is decided beforehand, and its setting data is stored in the program ROM or the like. Then, the display luminance of the organic EL monitor 9 is set to luminance corresponding to the average luminance when the average luminance of the image is equal to/higher than the reference value, whereby brightness of the displayed through-image is reduced.

Furthermore, according to the third embodiment, the normal mode and the power saving mode are selectable, and the brightness of the image displayed on the organic EL monitor 9 is limited only when the power saving mode is set. However, the power saving mode only may be provided without providing a normal mode.

Furthermore, according to the third embodiment, the automatic exposure control processing for controlling the luminance level of the image signal so that it may be a proper value is started in step SC1 of FIG. 6. However, without executing the automatic exposure control processing, processing for limiting the brightness of the image displayed on the organic EL monitor 9 may be executed when the average luminance of the image is equal to/higher than the reference value.

Fourth Embodiment

Next, a fourth embodiment of the present invention will be described. The block diagram of the fourth embodiment is the same shown in FIG. 1. According to the fourth embodiment, the program ROM stores a program for causing the CPU of the controller 5 to execute the following display luminance control different from those of the second and third embodiments.

Figure 7:
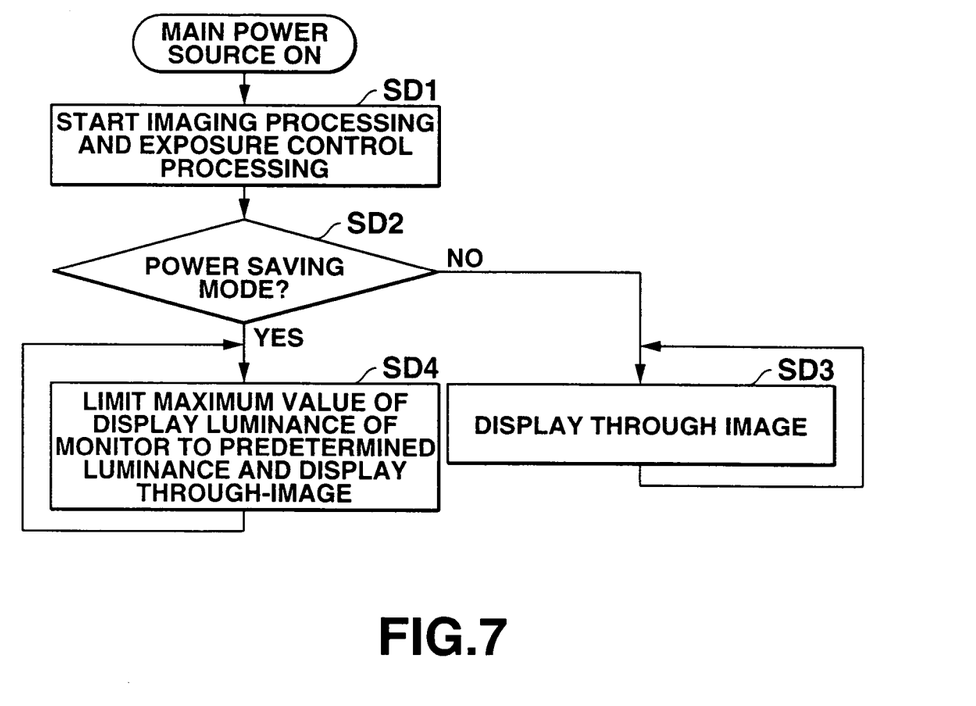
FIG. 7 is a flowchart showing a display luminance control operation of an organic EL monitor in the digital camera according to a fourth embodiment.

FIG. 7 is a flowchart showing a process of display luminance control executed by the CPU when a user turns on a main power source in a state in which a recording mode has been set according to the embodiment.

According to the fourth embodiment, after the main power source is turned on, the CPU starts cyclical imaging processing and exposure control processing (step SD1). Subsequently, if not a power saving mode but a normal mode is set (NO in step SD2), an image obtained by the imaging processing is displayed as a through-image on an organic EL monitor 9 (step SD3). Thereafter, the through-image displayed on the organic EL monitor 9 is updated for each imaging processing while the recording mode is set.

On the other hand, if the power saving mode is set when the main power source is turned on (YES in step SD2), the image obtained by the imaging processing is displayed as a through-image in a state in which an upper limit is set on display luminance of the organic EL monitor 9, i.e., emission luminance of an organic EL element 8 (step SD4). Accordingly, the through-image whose maximum brightness is limited to predetermined brightness, more specifically the through-image in which there is no portion of brightness equal to/higher than a predetermined luminance, is displayed. Thereafter, while the recording mode is set, the processing of step SD4 is repeated for each imaging processing, and the through-image displayed on the organic EL monitor 9 is updated.

As described above, according to the fourth embodiment, if the power saving mode has been set when the main power source is turned on, the display luminance of the organic EL monitor 9 is limited to the predetermined luminance, and the through-image displayed on the organic EL monitor 9 becomes a through-image whose maximum brightness is limited to the predetermined brightness.

Incidentally, according to the fourth embodiment, while the power saving mode is set, the maximum value of the display luminance of the organic EL monitor 9 is always limited to the predetermined luminance, and a through image having no portion which exceeds the predetermined luminance is displayed. However, the following may be employed. For example, the processing for limiting the maximum value of the display luminance of the organic EL monitor 9 may be limited to a certain period immediately after the on operation of the main power source. In this case, this period may be, e.g., the predetermined time described above with reference to the second embodiment, i.e., the time necessary for lowering the luminance level of the image signal to a certain luminance level which does not reach a proper value when the luminance level is a normally expected maximum level immediately after the start of exposure control, or the period described above with reference to the third embodiment until the average luminance of the image becomes the reference value or lower. In this case, effects similar to those of the embodiment can be obtained.

According to the fourth embodiment, as described above with reference to the second and third embodiments, the display luminance of the organic EL monitor 9 is limited by directly controlling the display luminance (emission luminance) thereof. However, the controller 5 may limit luminance of an image at a point of its generation based on an image signal beforehand, or control an amplification factor of an amplifier 13 when the generated image is output to the organic EL monitor, whereby the luminance of the image input to the organic EL monitor 9 may be limited to limit the display luminance thereof.

According to the fourth embodiment, the maximum value of the display luminance of the organic EL monitor 9 is limited to the predetermined luminance. However, the display luminance of the organic EL monitor 9 may be reduced as much as a predetermined percentage.

According to the fourth embodiment, the maximum value of the display luminance of the organic EL monitor 9 is limited to the predetermined luminance. However, for example, display luminance (display luminance lower than predetermined display luminance) of the organic EL monitor 9 corresponding to luminance of an image displayed thereon may be decided beforehand, and its setting data may be stored in the program ROM or the like. Then, the display luminance of the organic EL monitor 9 may be set to luminance corresponding to average luminance of an image of each time, whereby brightness of the displayed through-image may be reduced.

Additionally, according to the fourth embodiment, the normal mode and the power saving mode are selectable, and the brightness of the image displayed on the organic EL monitor 9 is limited only when the power saving mode is set. However, the power saving mode only may be provided without providing a normal mode.

Furthermore, according to the fourth embodiment, the automatic exposure control processing for controlling the luminance level of the image signal so that it may be a proper value is started in step SD1 of FIG. 7. However, without executing the automatic exposure control processing, processing for limiting the brightness of the image displayed on the organic EL monitor 9 may be executed.

The first to fourth embodiments have been described by way of case in which the organic EL monitor is employed as the self-luminous element of the present invention. However, other self-luminous elements such as a plasma display can be employed.

The first to fourth embodiments have been described by way of case in which the present invention is applied to the digital camera. The present invention may be applied to other imaging device which comprises a self-luminous type monitor for displaying an image, such as a portable telephone equipped with a camera, and PDA equipped with a camera.

What is claimed is:

1. An imaging device comprising:
   an imaging element which outputs an image signal obtained by an imaging operation;
   a self-luminous element which displays an image based on the image signal output from the imaging element;
   a limiting unit which limits brightness of the image displayed by the self-luminous element;
   an exposure control unit which controls a luminance level of the image signal output from the imaging element such that the luminance level becomes a proper value, wherein the self-luminous element displays the image based on the image signal whose luminance level is controlled by the exposure control unit, and wherein the limiting unit limits the luminance level of the image signal controlled by the exposure control unit to a lower level when a power is turned on;
   a setting unit to which an exposure control value is set, wherein the exposure control unit comprises a controller which controls the luminance level of the image signal output from the imaging element based on the set exposure control value, and wherein the exposure control value is set to cause the luminance level of the image signal to become the proper value; and
   a mode selection unit which selects a first control mode or a second control mode, and wherein the limiting unit comprises a setter which sets a first initial exposure control value to the setting unit when the first control mode is selected at a time of power on, and a second initial exposure control value which is lower than the first initial exposure control value to the setting unit when the second control mode is selected at the time of power on.

2. The imaging device according to claim 1, wherein the second initial exposure control value is set such that the exposure control unit causes the luminance level of the image signal output from the imaging element to always increase toward the proper value when the power is turned on.

3. The imaging device according to claim 1, wherein the second initial exposure control value is lower than a medium value in a range values when the power is turned on.

4. The imaging device according to claim 1, wherein the first exposure control value is a medium value in a range of values which can be set in the setting unit.

5. The imaging device according to claim 1, wherein:
   the imaging element continuously outputs a plurality of image signals obtained by a plurality of continuous imaging operations; and
   the exposure control unit determines the exposure control value based on a luminance level of a current image signal output from the imaging element and controls a luminance level of a next image signal based on the determined exposure control value.

6. The imaging device according to claim 5, wherein:
   the exposure control unit changes a current exposure control value by a predetermined value based on the luminance level of the current image signal output from the imaging element, and controls the luminance level of the next image signal based on the changed exposure control value.

7. The imaging device according to claim 1, wherein the exposure control unit controls the luminance level of the image signal by controlling at least one of a diaphragm amount of the imaging element, an exposure time of the imaging element, and an amplification factor of the image signal so that the luminance level becomes the proper value.

8. The imaging device according to claim 1, wherein:
   the exposure control unit controls the luminance level of the image signal by controlling at least one of a diaphragm amount of the imaging element, an exposure time of the imaging element, and an amplification factor of the image signal so that the luminance level may be a proper value; and
   the limiting unit controls the luminance level of the image signal to be low by controlling at least one of the diaphragm amount of the imaging element, the exposure time of the imaging element, and the amplification factor of the image signal.

9. An imaging device comprising:
   means for outputting an image signal obtained by an imaging operation;
   a self-luminous element which displays an image based on the output image signal;
   limiting means for limiting brightness of the image displayed by the self-luminous element;
   exposure control means for controlling a luminance level of the output image signal such that the luminance level becomes a proper value, wherein the self-luminous element displays the image based on the image signal whose luminance level is controlled, and wherein the limiting unit limits the luminance level of the image signal controlled by the exposure control means to a lower level when a power is turned on;

setting means for setting an exposure control value, wherein the exposure control means controls the luminance level of the output image signal based on the set exposure control value, and wherein the exposure control value is set to cause the luminance level of the image signal to become the proper value; and mode selection means for selecting a first control mode or a second control mode, and wherein the limiting means sets a first initial exposure control value to the setting means when the first control mode is selected at a time of power on, and a second initial exposure control value which is lower than the first initial exposure control value to the setting means when the second control mode is selected at the time of power on.

10. An imaging method comprising:

outputting an image signal obtained by an imaging operation;

controlling a self-luminous element to display an image based on the image signal;

limiting brightness of the image displayed by the self-luminous element; and controlling a luminance level of the output image signal such that the luminance level becomes a proper value, wherein the self-luminous element displays the image based on the image signal whose luminance level is controlled, and wherein the controlled luminance level is limited to a lower level when a power is turned on;

setting an exposure control value, wherein the luminance level of the output image signal is controlled based on the set exposure control value, and wherein the exposure control value is set to cause the luminance level of the image signal to become the proper value; and selecting a first control mode or a second control mode, wherein a first initial exposure control value is set when the first control mode is selected at a time of power on, and a second initial exposure control value which is lower than the first initial exposure control value is set when the second control mode is selected at the time of power on.

11. A computer readable medium having stored thereon an imaging control program which controls a computer of an imaging device to execute functions of:

outputting an image signal obtained by an imaging operation;

controlling a self-luminous element to display an image based on the image signal;

limiting brightness of the image displayed by the self-luminous element; and controlling a luminance level of the output image signal such that the luminance level becomes a proper value, wherein the self-luminous element displays the image based on the image signal whose luminance level is controlled, and wherein the controlled luminance level is limited to a lower level when a power is turned on;

setting an exposure control value, wherein the luminance level of the output image signal is controlled based on the set exposure control value, and wherein the exposure control value is set to cause the luminance level of the image signal to become the proper value; and selecting a first control mode or a second control mode, wherein a first initial exposure control value is set when the first control mode is selected at a time of power on, and a second initial exposure control value which is lower than the first initial exposure control value is set when the second control mode is selected at the time of power on.

* * * * *